(12) United States Patent
Murray

(10) Patent No.: US 8,636,908 B2
(45) Date of Patent: Jan. 28, 2014

(54) SYSTEM AND METHOD FOR TREATMENT OF WATER SYSTEMS

(71) Applicant: Aquifer Maintenance & Performance Systems, Inc., West Palm Beach, FL (US)

(72) Inventor: James Richard Murray, West Palm Beach, FL (US)

(73) Assignee: Aquifer Maintenance & Performance Systems, Inc., West Palm Beach, FL (US)

( * ) Notice: Subject to any disclaimer, the term of this patent is extended or adjusted under 35 U.S.C. 154(b) by 0 days.

(21) Appl. No.: 13/951,860

(22) Filed: Jul. 26, 2013

(65) Prior Publication Data

US 2013/0306567 A1 Nov. 21, 2013

Related U.S. Application Data

(62) Division of application No. 12/712,185, filed on Feb. 24, 2010, now abandoned.

(60) Provisional application No. 61/154,840, filed on Feb. 24, 2009.

(51) Int. Cl.
*C02F 1/76* (2006.01)

(52) U.S. Cl.
USPC ........ 210/743; 210/747.8; 210/756; 210/764; 166/300

(58) Field of Classification Search
USPC .............. 210/743, 747.8, 752, 756, 758, 764, 210/170.07, 192; 405/128.5, 128.75; 166/263, 300, 305.1, 311, 312, 75.12
See application file for complete search history.

(56) References Cited

U.S. PATENT DOCUMENTS

| | | | |
|---|---|---|---|
| 3,841,483 | A | 10/1974 | Overton |
| 4,532,040 | A | 7/1985 | Meeks et al. |
| 4,692,314 | A | 9/1987 | Etani |
| 5,866,010 | A | 2/1999 | Bogatin et al. |
| 2005/0194326 | A1 | 9/2005 | Calabrese |

OTHER PUBLICATIONS

Definition of "manifold" from Dictionary.com (obtained Jan. 23, 2013).

*Primary Examiner* — Lucas Stelling
(74) *Attorney, Agent, or Firm* — Sughrue Mion, PLLC

(57) ABSTRACT

A water treatment system for producing a sodium hypochlorite solution to control bacteria levels in well water containing: a pH adjuster; a container containing solid calcium hypochlorite for producing a calcium hypochlorite solution; and a container containing solid sodium carbonate for producing the sodium hypochlorite solution and a method of controlling bacteria levels in well water by using intermittent injections of a sodium hypochlorite solution with alternating pH values.

20 Claims, 5 Drawing Sheets

Automatic Bacteriological Control
stationary conversion unit

101

501

SYSTEM AND METHOD FOR TREATMENT OF WATER SYSTEMS

PRIORITY CLAIM

This application is a divisional of U.S. Ser. No. 12/712,185, filed Feb. 24, 2010, now pending, which claims priority to U.S. Provisional Application No. 61/154,840, filed Feb. 24, 2009, the contents of each of which are incorporated herein by reference in their entirety.

FIELD OF THE INVENTION

This invention relates to a system and method for the treatment of water systems. The invention more particularly relates to the control of subsurface bacteria associated with groundwater wells.

BACKGROUND OF THE INVENTION

The environmentally safe and economical production of clean drinking water continues to be a source of concern throughout the world. Typically, where the primary source of drinking water lies just under the ground surface, wells are used to obtain the water. Typical wellfields, whether involving single or multiple wells, are highly susceptible to bacterial invasion during use. Bacteria causes biofouling of the well screen and/or the well formation, decreasing well efficiencies and creating treatment problems for the water obtained. Therefore, the periodic rehabilitation of wells is required to prevent bacterial contamination.

Further, increasingly more stringent Safe Drinking Water Act regulations will require higher levels of treatment for raw water. Also, high bacteria levels in groundwater and raw water pipelines create problems with the more advanced treatment methods.

Conventional means of groundwater bacteria control using gross quantities of chlorine and acid based chemicals may be damaging to the wells in the long-term. Further, conventional means may also jeopardize advanced treatment methods, for example methods utilizing membranes. Additionally, bacteria control chemicals are typically transported and stored on site in a liquid state. Such liquid state chemicals pose an increased risk to the environment.

In many areas chlorine combined with naturally occurring organics in the groundwater create carcinogenic by-products such as trihalomethanes, which poses a human health risk. Trihalomethanes are created when organics in the well are mixed with large amounts of sodium hypochlorite.

The use of calcium hypochlorite alone may cause plugging of the well.

It is therefore an object of the invention to overcome the foregoing water treatment problems. It is further an object of the invention to:

Reduce chemical usage and decrease environmental and health risks;

Increase well efficiency and reduce operational costs;

Decrease conventional well rehabilitation costs;

Support advanced treatment technologies in meeting more stringent drinking water regulations;

Provide a unit with easy installation and minimal maintenance; and

Provide affordable bacteriologically controlled drinking water to all size water users.

SUMMARY OF THE INVENTION

The forgoing objects and other objects are achieved by a method and system in accordance with the principles of the invention.

In a water treatment system in accordance with the invention a small amount of dry chemical is used to generate a concentrated liquid solution in an enclosed environment, thereby greatly reducing environmental risk. Further, the invention minimizes chemical usage and greatly reduces trihalomethane formation during well rehabilitation.

The bacterial control unit of the present invention produces a treatment solution of sodium hypochlorite, which is supplied to the well water in the well. The starting materials for making the sodium hypochlorite ($NaOCl[5H_2O]$) solution are dry (solid) calcium hypochlorite ($Ca(OCl)_2$) (lime ion) and dry (solid) sodium carbonate ($Na_2CO_3$) (soda ash).

Water is run into the apparatus where the pH is adjusted and the chemicals are mixed to provide the treatment solution. The treatment solution is intermittently injected into the well to control bacteria.

In the water treatment system of the present invention, the intake water optionally flows through a sediment primary filter to remove debris if necessary. The water then flows through the means for adjusting the pH and into a container containing dry calcium hypochlorite to form a calcium hypochlorite solution. The calcium hypochlorite solution flows into a container containing soda ash. The calcium hypochlorite and the soda ash are mixed and react to form a sodium hypochlorite containing solution. Calcium carbonate is also formed, but is unimportant to the present invention.

The treatment solution preferably contains at least 40% by volume sodium hypochlorite. More preferably the treatment solution contains 40 to 50% by volume sodium hypochlorite. Preferably, the sodium hypochlorite solution also contains unreacted calcium hypochlorite. A high % (40-50%) of sodium hypochlorite is more stable than other sodium hypochlorite solutions, while retaining calcium hypochlorite (lime ion).

In an alternative form of the invention, additional calcium hypochlorite solution is mixed with the sodium hypochlorite solution prior to the injection of the treatment solution into the well.

Where the well water to be treated is hard, the apparatus preferably contains a means for adjusting the surface tension of water.

The treatment solution is designed to penetrate the protective sheath surrounding the bacteria via reduced surface tension, which allows for the use of reduced amounts of chemicals while still effectively oxidizing and killing the bacteria.

More preferably, the incoming water enters the apparatus and the surface water tension is adjusted before coming in contact with any chemicals. The pH of the water is then adjusted and the water enters the calcium hypochlorite canister.

The chemicals, calcium hypochlorite (lime ion) blended with sodium carbonate (soda ash) form a stable, long lasting sodium hypochlorite that preferably retains the lime ion. Lime ion retention provides more available chlorine which enhances the disinfection process.

The system and method of the invention may be used on any type of well system, for example, small, medium, and large wells. The amount of treatment solution depends on the contact area of the well to be treated.

Once installed, the water treatment system can be operated manually, controlled by the water plant operators, or through a water treatment plant telemetry system, which senses a pressure loss when the well pump is shut off and turns the water treatment system on. The unit may be easily maintained, for example on a monthly basis by a single field technician to vary pH level and replace chemicals as needed.

The water treatment system provides an efficient means to continuously control bacteria at the wellhead with reduced chemical usage and decreased environmental and health risks. The unit can be operated manually or automatically with minimal maintenance. The unit is a vehicle to prolong well life and works in concert with advanced treatment methods to meet more stringent drinking water regulations. The unit is an effective means of controlling bacteria by increasing well efficiency and decreasing associated well electrical operating costs. The high cost of conventional well rehabilitation is slashed, making bacteriologically controlled drinking water affordable to homeowners, farmers and small utilities in the United States and abroad.

The method for the treatment of water systems of the invention is preferably used with the system of the invention.

Time of Treatment

The treatment solution may be injected into the well system any time the main well pump is shut off. The treatment should be performed on a regular, periodic basis. Treatment should be performed every 10 to 45 days, depending on the condition of the well. More preferably, treatment should be preformed every 20 to 28 days, or on a monthly basis. During the contact time (the time the treatment solution is in the well) the main well pump should be turned off. The contact time of the treatment solution in the well is generally about 12 hours. Preferably the contact time is more than 6 hours. While the contact time of the treatment solution in the well is preferably more than 6 hours, the treatment solution may be injected into the well in a shorter period of time. For example, treatment solution may be injected into the well for a period of one hour during each treatment.

pH of the Treatment Solution

Waterborne bacteria can become immune to oxidizing agents over time. This is why the pH adjustment manifold is an important aspect of the apparatus. On a periodic basis, the pH level of the treatment solution is varied prior to injection into the well. Alternating the pH level places the bacteria in alternating dormant and excited states. This inhibits bacteria growth and results in bacteria self-consumption as the stressed bacteria consume their protective sheath. This also helps to maintain the susceptibility of the bacterial to the sodium hypochlorite treatment solution.

The means for pH control may be any means for pH control. Preferably the pH is controlled by means of a magnetic field. The electro magnetic pH adjuster or pH manifold is a device with external magnets having one pole neutralized through which the softened intake water is channeled. The pole to be neutralized depends on the desired pH range. Multiple external magnets may be used to control the pH level, such as systems containing one, two or three magnets. See FIG. 5.

The pH adjustment manifold shown in FIG. 5 contains three magnets, each with one pole neutralized. For example, tin or rubber may used to cover one pole of the magnet. The solution is passed through the pH adjustment manifold and past one, two or three of the magnets depending on the pH range desired. FIG. 5 also illustrates how the water flow may be controlled to adjust the number of magnets in the water flow path to control the pH.

Potential hydrogen ion activity or pH is defined as the concentration of hydrogen (H+) and the hydroxide (OH−) ions actually measured in a solution. As the concentration of hydrogen is increased and the hydroxide is decreased, the solution becomes acidic (less than 7 pH). When the hydrogen concentration is decreased and the hydroxide concentration is increased then the solution becomes alkaline (greater than 7 pH). Equal ionic concentrations provides a basic solution or neutral pH of 7.

The pH manifold control valves allow the pH level to be controlled. The pH adjusted water provides short term molecular alignment of the water molecules within the treatment solution. This enhances disinfecting properties.

When using magnets as the pH control means, the most important factors are mass, gauss, and directional consistence (all magnets should be influencing the fluid with the same polarity).

The pH control means preferably contains magnets producing a high gauss magnetic field. Preferably the magnets are at least 5,500 gauss. More preferably, pH control means contains three magnets, each about 7,000 gauss.

The pH of the treatment solutions should be alternated between high (basic) and low (acid) pH solutions. It does not matter whether the initial treatment solution is a high pH or a low pH.

The pH of the treatment solution is set depending on the type of bacterial contamination in the well.

In general wellborn bacteria prefer a pH environment of from about 5 to 7.

The pH of the treatment solution is generally set within the range of 4 to 11. More preferably, the pH of the treatment solution is outside the range of 5 to 7.

Preferably the pH of the alternate treatment solutions varies by at least three units. Preferably the pH of the acidic treatment solution should be below pH of about 5. More preferably, the pH of the acidic treatment solution should be pH of about 4.5. Preferably the pH of the basic treatment solution should be above a pH of about 7. More preferably the pH of the basic treatment solution should be above a pH of about 8. Most preferably the pH of the basic treatment solution should be above a pH of about 8.5.

Preferably, the pH of the treatment solution is alternated between a pH of about 4.5 and a pH of about 8.5.

The pH may be controlled automatically or manually, for example using feed back from an electronic pH meter or pH paper strips.

Surface Tension Control

Where the well water to be treated is hard, the apparatus preferably contains a means for adjusting the surface tension of water. Softening the water makes the treatment more effective.

The means for surface tension control may be the unit with which the intake water first comes in contact. Generally, the surface tension of the intake water is reduced. The means for surface tension control may be any means for surface tension control. Preferably, the surface tension is controlled through ionization. More preferably the surface tension control means uses a magnetic field where the normally negative polarity water is converted to positive polarity water. Calcium, magnesium carbonates, biocarbonates, and sulfates are kept in suspension. This produces soft water with enhanced wetability properties. Water softening makes treatment more effective. Softening the treatment water allows penetration deep within the dense bacteriological biomass by creating a cellular rupturing effect (lysing) which kills the bacteria. Softening the treatment water also decreases the amount of chemicals that are needed by enabling the chemicals to become super-saturated and pure during blending.

The magnetic field of the magnetic surface tension control means preferably contains magnets producing a medium gauss magnetic field. More preferably, the magnetic field of the magnetic surface tension control is about 3,500 gauss.

Bacteria

The system and method of the present invention may be used to control nuisance or plugging bacteria commonly associated with well systems. For example:

Iron Bacteria

These organisms are aerobic (living or active only in the presence of oxygen). They are found in many types of water but thrive in water which is slightly acidic (5 to 7 pH) and contains iron. Ferrous iron is assimilated and exuded as ferrous hydroxide in the sheath surrounding the cells. The ferrous hydroxide combines with oxygen to form ferric hydroxide. Rapid growth under certain conditions can create dense plugging deposits. The iron bacteria usually found are *Clonothrix, Crenothrix, Gallionella, Leptothrix, Siderocapsa*, or *Sphaerotilus*.

Sulfate-Reducing Bacteria

These organisms are anaerobic (living or active in the absence of free oxygen). They often develop in water that is very low in oxygen and that contain sulfates and organic matter. The bacteria assimilate the sulfates and reduce them to hydrogen sulfide. Favorable water pH is between 5.5 and 8.5. The bacteria are minute, curved, rod-shaped organisms, usually identified as *Disulfovibrio* with minor variations.

Sulfur-Bacteria

These bacteria reduce sulfides to sulfur and sometimes to sulfates. When growing in the presence of hydrogen sulfide, the chain cells may contain sulfur. Those most often found are Neggiatoa, thioplaca, thiospirillopsis, and thiothrix.

Slime Forming Bacteria

Direct or indirect slime formation is a property of many types of nuisance bacteria found in well water systems. Once a film is formed, growths and absorption of suspended and colloidal materials increases the rate of accumulation.

The main source of food is reduced inorganic compounds. Small amounts of organic matter present can act as a source of energy. These bacteria have the ability to resist chemical treatments due to the protective sheath surrounding them. They can only be treated with low surface tension. pH ranges will differ with water quality.

Pathogenic Bacteria

For example, *Pseudomonads, P. aeruginosa, Halotrophic P.* (usually found within iron related bacteria) *Escherichia Coli* and *Vibrio Cholerae*.

The objects, features and advantages of the invention will be apparent from the accompanying drawings, and from the following detailed description of the preferred embodiment of the invention.

DETAILED DESCRIPTION

Figure 1:
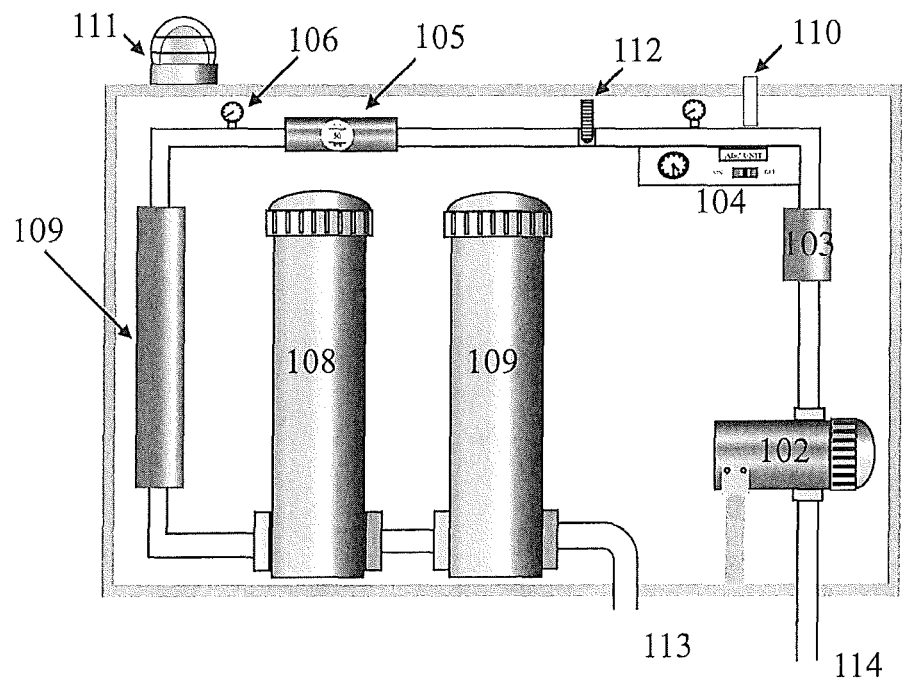
FIG. 1 illustrates a stationary well water treatment system according to the present invention.
Figure 2:
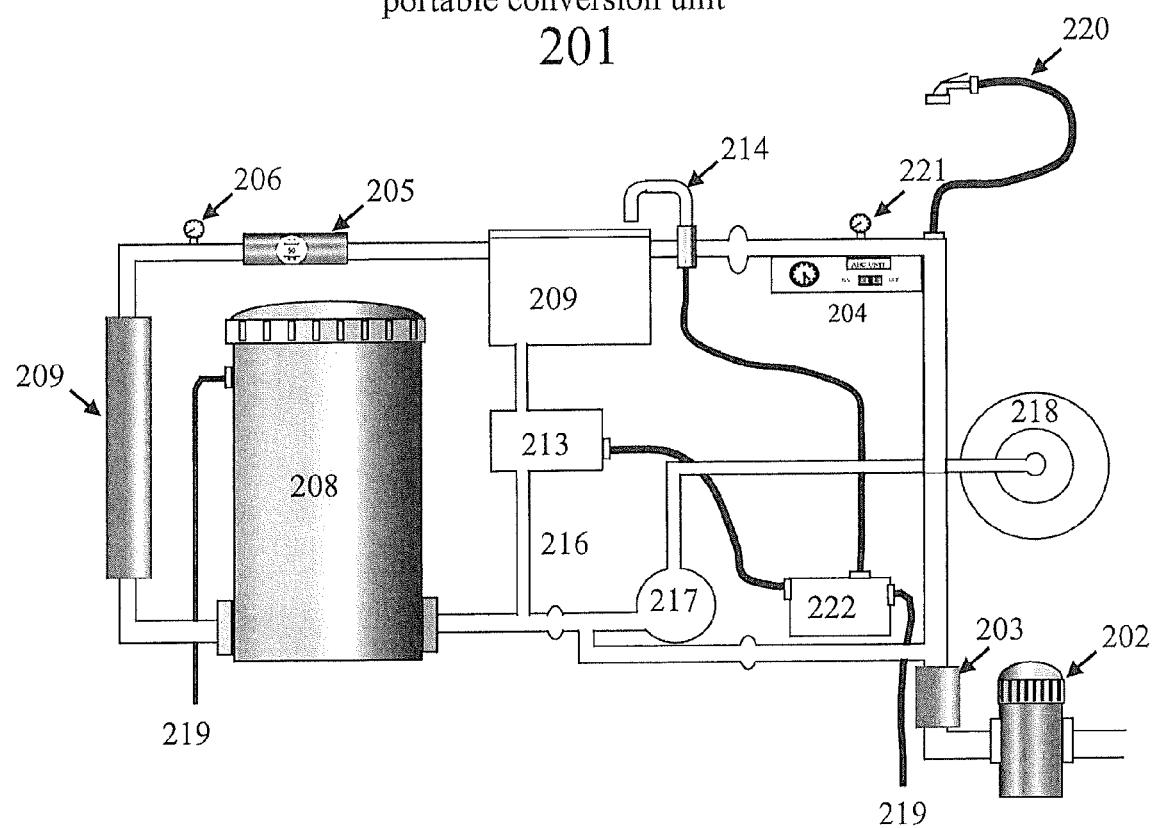
FIG. 2 illustrates a portable well water treatment system according to the present invention.

The water treatment system may be a stationary unit (FIG. 1) mounted at the wellhead (FIGS. 3 and 4) or mobilized to the site as a portable unit (FIG. 2). The water used to prepare the treatment solution may be obtained from any water source. Usually it is most convenient to use water directly from the well to be treated.

Referring to FIG. 1, a stationary unit 101 is shown. The stationary unit is approximately 24"×24"×15" in size and can be easily mounted in the area of the wellhead.

Water flows through the input line 113 to the sediment primary filter 102 to remove debris. The water then flows through the surface tension control 103 which directs polarities of water molecules in one direction in order to soften the water. The water then flows through the fluid control panel 104, the batch totalizer 105, the temperature gauge 106 and the pH adjuster 107. The water then flows into the calcium hypochlorite (lime ion) canister 108 where a calcium hypochlorite solution is formed. The calcium hypochlorite solution then flows into the soda ash container 109 where the calcium hypochlorite solution is mixed with soda ash to form the sodium hypochlorite treatment solution. The sodium hypochlorite treatment solution then flows out the output line 114 to the well.

The stationary unit 101 may also contain an air vent check valve 110 to evacuate air from the system and an indicator light 111 to show when the unit is operating. A flow meter 112 shows the rate of water flow and the batch totalizer 105 keeps track of the volume of water that has flowed through the system.

Referring to FIG. 2, a portable unit 201 is shown. Water flows through the sediment primary filter 202 to remove debris. The water then flows through the surface tension control 203 which directs polarities of water molecules in one direction in order to soften the water. The water then flows through the fluid control panel 204, the pressure gauge 221, the batch totalizer 205, the temperature gauge 206 and the pH adjuster 207. The water then flows into the calcium hypochlorite (lime ion) canister 208 where a calcium hypochlorite solution is formed.

When the fluid fills to a preset level, the calcium hypochlorite solution triggers a pump switch 213 and the solution flows through the pump switch and down to the float switch 222 and is then pumped through the mixing jet 214 to the mixing tank 209, which contains sodium carbonate (soda ash). In the mixing tank 209 a sodium hypochlorite solution is formed.

The pump switch also pumps the sodium hypochlorite solution down to the outlet line 215 of the mixing tank 209 to an outlet line 216 of calcium hypochlorite canister 208 where the hypochlorite treatment solution and additional calcium hypochlorite solution are mixed to form the sodium hypochlorite treatment solution.

Finally, the sodium hypochlorite solution with the retained calcium hypochlorite (lime ion) are pumped via a pump 217 through the hose reel 218 to the well.

By-pass lines 219 are located on the calcium hypochlorite canister and the float switch, respectively, for preventing overflow. A wash down hose 220 is attached to the apparatus for cleaning the water treatment system.

Figure 3:
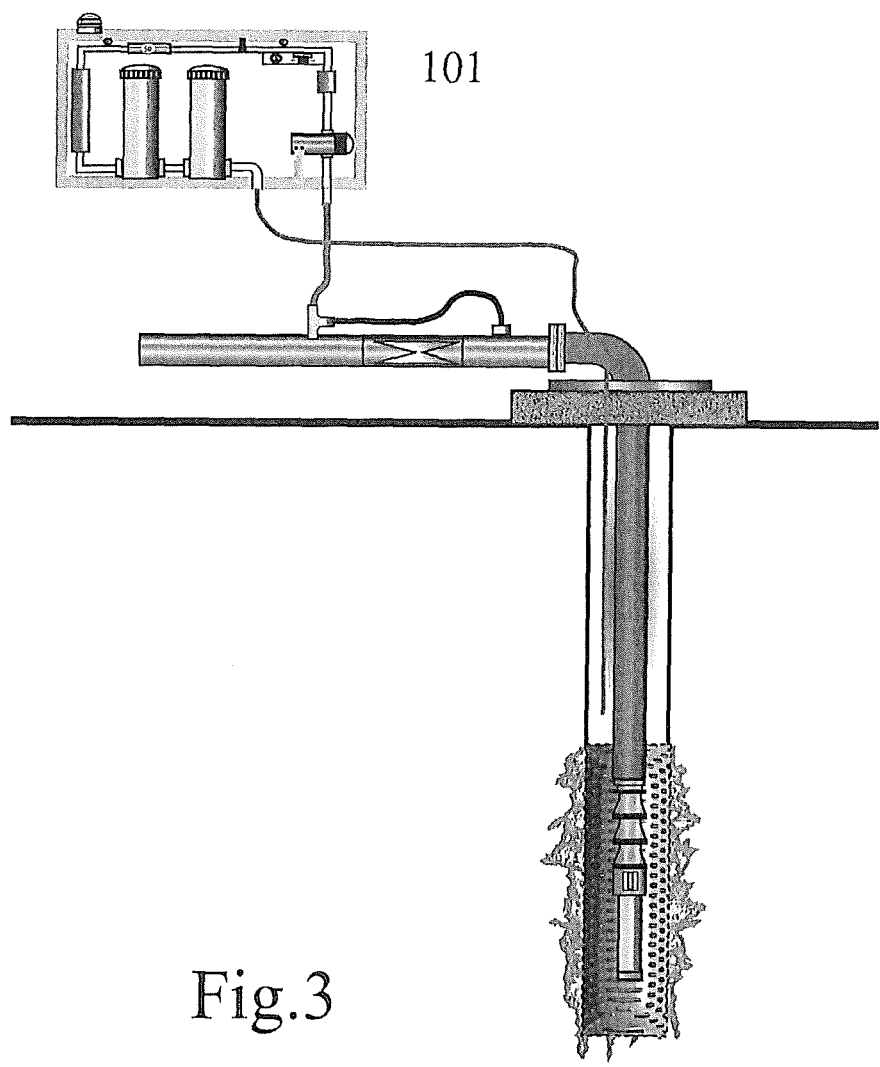
FIG. 3 illustrates the use of a stationary well water treatment system according to the present invention with a submersible well pump system.

Referring to FIG. 3 the stationary system 101 is attached to submersible well pump system that uses a submersible well pump.

Figure 4:
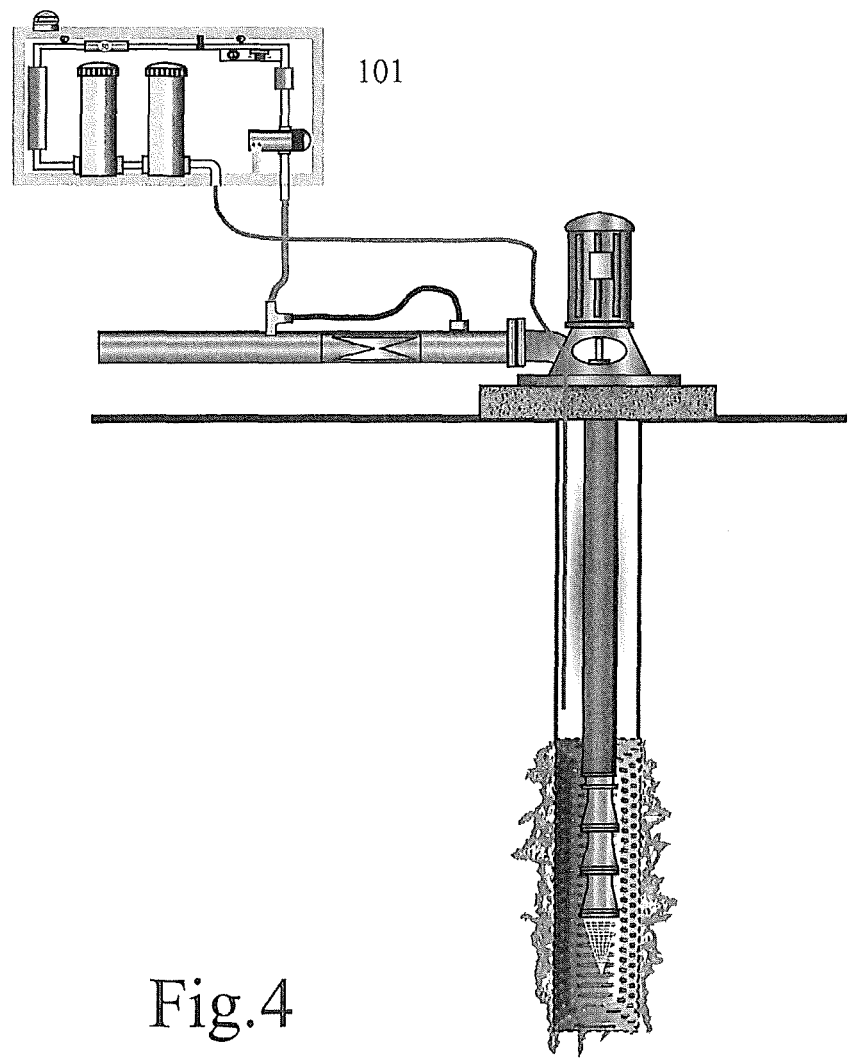
FIG. 4 illustrates the use of a stationary well water treatment system according to the present invention with a vertical turbine well pump system.

Referring to FIG. 4 the stationary system 101 is attached to well pump system that uses a vertical turbine pump.

Figure 5:
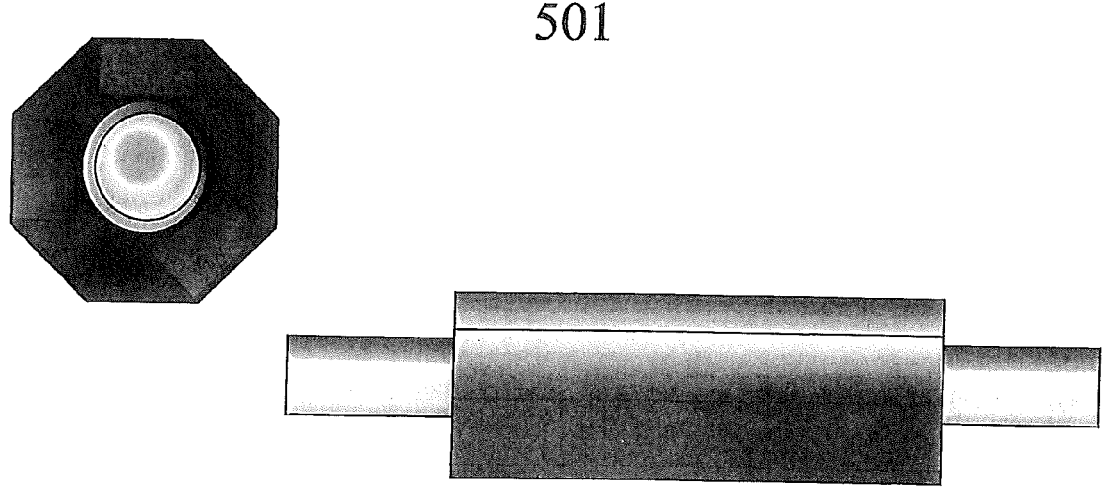
FIG. 5 illustrates a pH adjustment manifold useable in the present invention.

FIG. 5 illustrates a pH adjustment manifold 501 useable in the present invention. Three magnets are connected in series. The valves control water flow so that water flows through none, one, two, and/or three of the magnets, depending on the pH requirements desired.

The effect of the variation in pH of the present method is shown in the following test example. The supply water of the test example exhibited significant bacteria activity levels, indicating the potential for biofouling downstream treatment systems and biological regrowth within the well pump system and pipelines.

At monthly intervals (30-day cyclical injections), the well was treated with 250 gallons of a sodium hypochlorite treatment solution with pH as shown in Table 1. The contact area was a 3150 gallon plume with an eight hour contact time.

TABLE 1

| First Month (1st injection) | 4.5 pH |
| Second Month (2nd injection) | 8.5 pH |
| Third Month (3rd injection) | 4.5 pH |
| Fourth Month (4th injection) | 8.5 pH |

No residual chemicals were recorded at the end of the total contact time and the pH returned to the original 6.9. The composite bacteriological results are shown in Table 2. Table 2 show the results of average log heterotropic plate counts (colony forming units (CFU) per ml.

TABLE 2

| First Month | 4.20 CFU/ml |
| Second Month | 3.86 CFU/ml |
| Third Month | 2.73 CFU/ml |
| Fourth Month | 1.32 CFU/ml |

As seen from the results of Table 2, the method using pH control of the present invention is effective in controlling bacteria activity levels in well water systems.

What is claimed is:

1. A method for controlling bacteria levels in well water, comprising:
   (a) introducing well water into a water treatment system;
   (b) adjusting the introduced well water to a first pH;
   (c) contacting the pH adjusted well water with dry calcium hypochlorite to form a calcium hypochlorite solution;
   (d) contacting the calcium hypochlorite solution with sodium carbonate to form a sodium hypochlorite containing solution; and
   (e) supplying the sodium hypochlorite containing solution into the well, thereby reducing bacterial content in the well water.

2. The method of claim 1, wherein prior to adjusting the pH of the well water, the well water is filtered in a sediment filter.

3. The method of claim 1, further comprising mixing the sodium hypochlorite containing solution with additional dry calcium hypochlorite prior to supplying the sodium hypochlorite containing solution into the well.

4. The method of claim 1, further comprising reducing a surface tension of the introduced well water prior to adjusting the pH thereof.

5. The method of claim 1, wherein the sodium hypochlorite containing solution contains at least 40% by volume sodium hypochlorite.

6. The method of claim 5, wherein the sodium hypochlorite containing solution contains about 40 to 50% by volume sodium hypochlorite.

7. The method of claim 1, wherein the sodium hypochlorite containing solution contains unreacted calcium hypochlorite.

8. The method of claim 1, further comprising repeating steps (a)-(e), wherein upon repeating step (b), the well water is adjusted to a second pH that varies by at least 3 units from the first pH.

9. The method of claim 8, wherein the first pH and the second pH are between 4 and 11.

10. The method of claim 8, wherein the first pH is acidic and the second pH is basic.

11. The method of claim 8, wherein the first pH is basic and the second pH is acidic.

12. The method of claim 8, wherein one of the first pH and the second pH is below a pH of about 5 and the other is above a pH of about 7.

13. The method of claim 8, wherein one of the first pH and the second pH is a pH of about 4.5 and the other is a pH of about 8.5.

14. The method of claim 8, wherein repeating step (e) occurs 10 to 45 days after performing step (e) a first time.

15. The method of claim 1, wherein the step of adjusting the introduced well water to a first pH comprises passing the introduced well water through an electromagnetic pH adjuster.

16. The method of claim 15, wherein the electromagnetic pH adjuster comprises at least one pole neutralized magnet.

17. The method of claim 16, wherein the electromagnetic pH adjuster produces a magnetic field of in the range of about 1250 to 1350 gauss.

18. The method of claim 4, wherein the step of reducing a surface tension of the introduced well water comprises passing the introduced well water through a water softener configured to ionize the well water, thereby reducing its surface tension.

19. The method of claim 18, wherein the water softener ionizes the well water using a magnetic field.

20. The method of claim 19, wherein the magnetic field is about 7500 gauss.

* * * * *